Figure 1:
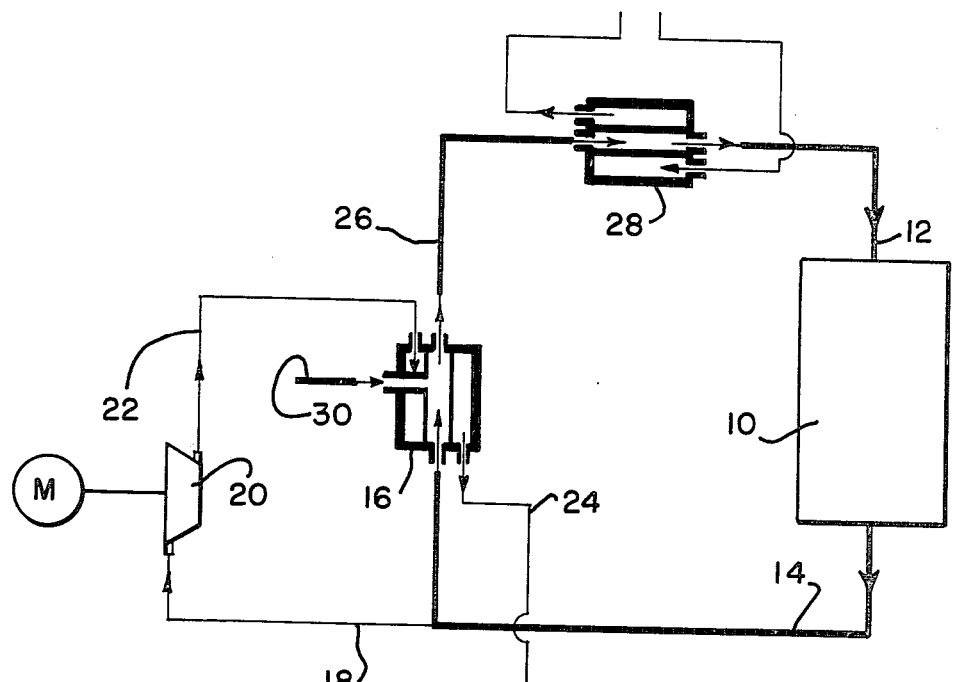

United States Patent [19]

Luthi

[11] 4,242,808
[45] Jan. 6, 1981

[54] PAPER WEB DRYING SYSTEM AND PROCESS

[75] Inventor: Oscar Luthi, Nashua, N.H.

[73] Assignee: Ingersoll-Rand Company, Woodcliff Lake, N.J.

[21] Appl. No.: 963,008

[22] Filed: Nov. 22, 1978

[51] Int. Cl.³ ............................................. F26B 3/04
[52] U.S. Cl. ............................................. 34/23; 34/35; 34/86; 34/155; 34/219; 68/5 C; 162/207
[58] Field of Search .................... 68/5 C, 5 D, 5 E; 34/35, 86, 219, 155, 15, 23, 31, 223, 224, 225, 16; 122/26, 36; 237/67; 162/207, 290; 60/648

[56] References Cited

U.S. PATENT DOCUMENTS

| 2,760,410 | 8/1956 | Gillis | 34/155 |
| 3,362,080 | 1/1968 | Daane | 34/86 |
| 4,050,445 | 9/1977 | Huse | 126/433 |
| 4,122,611 | 10/1978 | Marchal et al. | 34/155 |
| 4,146,361 | 3/1979 | Cirrito | 34/155 |

Primary Examiner—Larry I. Schwartz
Attorney, Agent, or Firm—Frank S. Troidl

[57] ABSTRACT

The paper web is directly contacted with superheated steam to evaporate the water in the paper web by direct contact and to remove some of the superheat from the steam. The exhaust steam is again superheated and recycled back to the direct contact dryer.

The paper web drying system includes a direct contact dryer, a superheater such as a heat exchanger, means for feeding the exhaust steam from the direct contact dryer to the heat exchanger, and means for feeding superheated steam from the heat exchanger back to the direct contact dryer.

4 Claims, 2 Drawing Figures

PAPER WEB DRYING SYSTEM AND PROCESS

This invention relates to pulp and paper processes. More particularly, this invention is a new method and new system for drying paper.

A typical currently used paper drying system uses atmospheric air. The air is heated in a combustion chamber to a temperature of 350° F. to 700° F. The heated gas is conducted to a dryer and water is evaporated from the paper web. The moist air is then removed from the system at approximately 200° F. Since the air is generally not saturated after one pass through the dryer a recirculation line is generally provided to further save energy.

Some disadvantages of the typical currently used drying system is that the evaporated water from the pulp sheet or web is exhausted from the system in the form of water vapor. The total energy of vaporization is lost to the atmosphere. The economic recovery of the energy of vaporization is difficult because the water vapors are mixed with air.

With my new paper web drying system and process, the heat of vaporization is not lost but is utilized in the drying system itself or is used by other equipment or processes where heat is required in the paper making system.

Briefly described, my new method of drying a paper web includes the steps of directly contacting the paper web with superheated steam to evaporate the water in the paper web by direct contact and cooling the superheated steam. The exhaust steam is then again superheated and the superheated steam is again used in the drying of the paper web.

My new system for drying a paper web comprises a direct contact dryer, a superheater, means for feeding exhaust steam from the direct contact dryer to the superheater, and means for feeding superheated steam from the superheater to the direct contact dryer.

By using superheated steam rather than air as the drying medium, almost all air is eliminated from the system. Also, the heat content per unit volume of steam is approximately 25 percent greater than the heat content of air which results in smaller drying units and gives additional savings in the size of the hardware such as fans, duct work, and other equipment.

This invention is applicable for all drying equipment where the drying medium comes in contact with the paper web. For the more porous grades of paper such as tissues and towels, the drying medium is blown through the web thus heating the water in the web and carrying away the vapors at the same time. For denser grades of paper, impingement drying is used where a jet of hot drying medium is impinged on the paper web.

Figure 2:
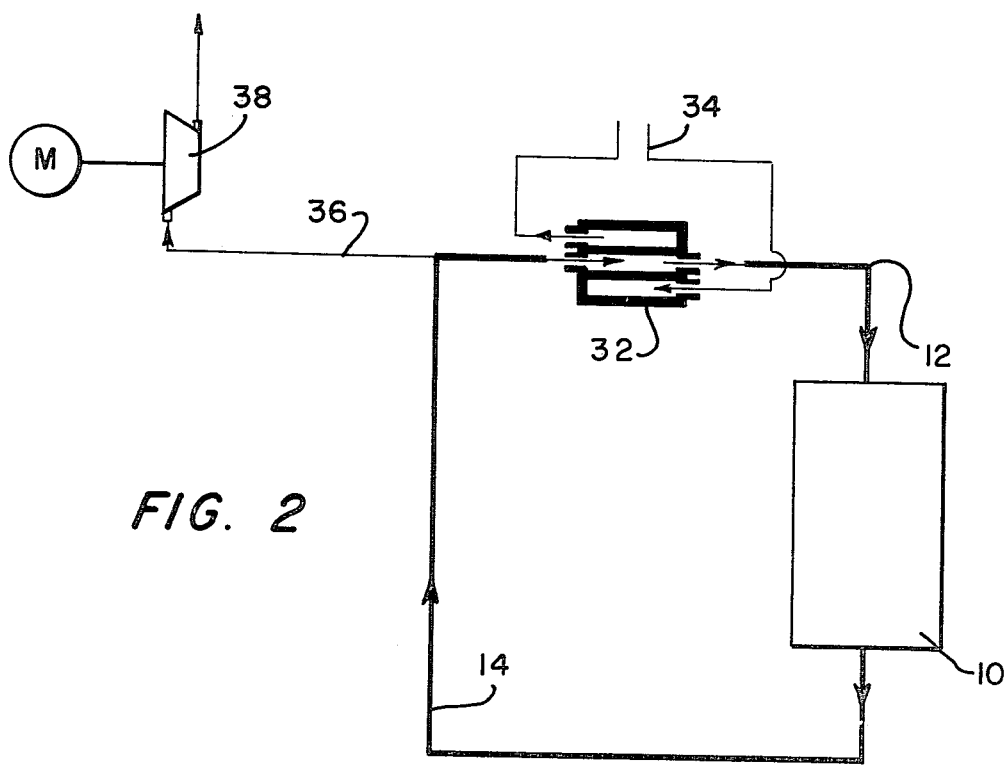

The invention, as well as its many advantages, may be further understood by reference to the following detailed description and drawings in which:

FIG. 1 is a schematic flow diagram illustrating one preferred embodiment of my new paper web drying system and process; and FIG. 2 is a schematic flow diagram illustrating a second preferred embodiment of my new paper web drying system and process.

In the various figures, like parts are referred to by like numbers.

Referring to the drawings and more particularly to FIG. 1, the new system includes a direct contact dryer 10. The direct contact dryer 10 may, for example, be a so-called thru-dryer wherein the superheated steam flows through the paper web to evaporate the water in the web. Alternatively, if denser grades of paper are being made, the direct contact dryer 10 may be an "impingement" dryer wherein jets of hot superheated steam are simply impinged upon the inside, or the outside or both sides of the paper web as distinguished from flowing the superheated steam through the paper web to evaporate the water from the paper web.

Superheated steam of say 350° F. at atmospheric pressure enters the direct contact dryer 10 from superheated steam feed line 12. The superheated steam is used to evaporate the water in the paper web by direct contact. The exhaust steam is piped from the direct contact dryer 10 and is fed through exhaust steam line 14 to the heat exchanger 16. A minor portion of the exhaust steam is fed through line 18 to the compressor 20 where the temperature of the exhaust steam is raised by vapor compression. The compressed steam is then fed through line 22 to the heat exchanger 16 where the compressed steam is used as the heating medium to superheat the major portion of the exhaust steam in the heat exchanger 16. The compressed steam will condense in the heat exchanger and is recovered in liquid form from the condensed compressed steam line 24.

A superheated steam line 26 feeds the superheated steam to a small heat exchanger 28 where the superheated steam is further heated if necessary. The superheated steam is returned to the direct contact dryer 10 through superheated steam line 12.

Steam makeup line 30 leads into heat exchanger 16 for the purpose of start-up or adding steam to the system to make up for any steam losses in the system.

In the preferred embodiment shown in FIG. 2, steam which has been superheated to say 350° F. to 700° F. at atmospheric pressure is flowed to the direct contact dryer 10 which may be a thru-dryer or an impingement dryer, by means of superheated steam line 12. The water in the paper web is evaporated from the paper web by direct contact of the superheated steam with the paper web. The evaporation cools the superheated steam to near saturation which is 212° F. at atmospheric pressure. The exhaust steam is fed from the direct contact dryer 10 to a superheater such as heat exchanger 32 by means of saturated steam line 14. The exhaust steam is superheated as it flows through the heat exchanger 32 by an external heat source fed to the heat exchanger 32 by means of external heat source line 34.

The superheated steam from heat exchanger 32 is recycled back to the direct contact dryer 10 through superheated steam line 12.

We have an excess of steam in the recycling line 14 by the amount of water evaporated from the paper web. This excess steam is bled off from the exhaust steam line 14 through a branch steam line 36 and fed to the compressor 38 where it is compressed to a higher temperature and pressure in the compressor. The compressed steam can now be used as the heating medium in other parts of the mill.

Clearly, the heat of evaporation is recovered using my new system and process. Also, substantially all exhaust gases from the dryer system are eliminated.

Another important feature of this invention is that in direct contact drying of a paper web, it is unavoidable that some fine fibers are carried away from the paper web and are recycled with the dryer medium. These fine fibers tend to hang up in dead corners or protrusions in the system where they continue to be dried out by the dryer medium. If air were used as the drying medium, there is danger that these dried out fiber bundles will catch fire and the soot carried away into the paper sheet. With superheated steam, since the use of air is eliminated, this danger does not exist as there is no oxygen present to sustain combustion.

I claim:

1. A method of drying a paper web in a paper mill comprising: directly contacting the paper web with superheated steam to evaporate the water in the paper web by direct contact and exhausting said steam; feeding a major portion of the exhaust steam to a superheater, and a minor portion of the exhaust steam to a compressor where it is compressed and heated for use in other elements of the paper mill; superheating said major portion of the exhaust steam; and using said superheated steam in the drying of the paper web.

2. A method in accordance with claim 1 wherein: the major portion of the exhaust steam is fed to a heat exchanger and and the compressed and heated steam is fed to said heat exchanger for use in superheating said major portion of exhaust steam.

3. A system for drying a paper web in a paper mill comprising: a direct contact dryer with an exhaust steam outlet; a superheater; means for feeding a major portion of the exhaust steam from said direct contact dryer to said superheater; a compressor; means for feeding a minor portion of the exhaust steam from the direct contact dryer to the compressor where said minor portion is compressed and heated; means for feeding the heated steam from the compressor to other elements of the paper mill; and means for feeding the superheated steam from said superheater to said direct contact dryer.

4. A system in accordance with claim 3 wherein: the superheater is a heat exchanger; and the other elements of the paper mill includes said heat exchanger.

* * * * *